United States Patent
Okamura

(10) Patent No.: US 10,576,595 B2
(45) Date of Patent: Mar. 3, 2020

(54) MANUAL PULSE GENERATING DEVICE

(71) Applicant: FANUC CORPORATION, Yamanashi (JP)

(72) Inventor: Hideki Okamura, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/819,286

(22) Filed: Nov. 21, 2017

(65) Prior Publication Data

US 2018/0141180 A1     May 24, 2018

(30) Foreign Application Priority Data

Nov. 24, 2016  (JP) ................................ 2016-228285

(51) Int. Cl.
*B23Q 5/22*      (2006.01)
*B23Q 1/00*      (2006.01)
*G05B 19/409*   (2006.01)
*G05B 19/00*     (2006.01)

(52) U.S. Cl.
CPC ........... *B23Q 5/225* (2013.01); *B23Q 1/0045* (2013.01); *G05B 19/00* (2013.01); *G05B 19/409* (2013.01); *G05B 2219/35459* (2013.01)

(58) Field of Classification Search
CPC .............. B23Q 11/1084; B23Q 17/007; B23Q 1/0045; B23Q 5/225; G05B 19/00
USPC ............................... 173/90, 162.1, 1–2, 213
See application file for complete search history.

(56) References Cited

U.S. PATENT DOCUMENTS

| | | | | |
|---|---|---|---|---|
| 2,501,008 A | * | 3/1950 | Schramm | F16K 35/027 192/95 |
| 2,737,371 A | * | 3/1956 | Gerry | A47J 43/044 310/50 |
| 2,788,675 A | * | 4/1957 | Hosea | B23Q 5/18 477/15 |
| 2,857,808 A | * | 10/1958 | Hastings | G02B 21/32 310/306 |
| 3,044,322 A | * | 7/1962 | George | B23B 29/03414 33/628 |
| 3,221,192 A | * | 11/1965 | Franklin | H01H 9/061 310/50 |

(Continued)

FOREIGN PATENT DOCUMENTS

CN       1192033 A      9/1998
CN     101011803 A      8/2007

(Continued)

OTHER PUBLICATIONS

English Abstract and Machine Translation for Japanese Publication No. 11-305815 A, published Nov. 5, 1999, 7 pgs.

(Continued)

*Primary Examiner* — Robert F Long
(74) *Attorney, Agent, or Firm* — Fredrikson & Byron, P.A.

(57) ABSTRACT

A manual pulse generating device is equipped with a rotatable dial, a pulse generating unit configured to generate drive pulses for commanding axial movement of a machine tool in accordance with an amount of rotation of the dial, and a casing having the dial disposed on a surface of the casing and accommodating the pulse generating unit in the interior thereof. When the dial is pressed toward the casing, the pulse generating unit enables the axial movement in accordance with the drive pulses.

9 Claims, 8 Drawing Sheets

(56) References Cited

U.S. PATENT DOCUMENTS

| | | | | |
|---|---|---|---|---|
| 3,725,624 | A * | 4/1973 | Emmons | A47J 43/044 200/569 |
| 4,028,571 | A * | 6/1977 | Dicke | H01H 9/16 310/43 |
| 4,085,337 | A * | 4/1978 | Moeller | B21J 15/048 173/205 |
| 4,461,330 | A * | 7/1984 | Judkins | B23Q 11/0092 144/154.5 |
| 4,465,005 | A * | 8/1984 | Eguchi | D05B 67/00 112/136 |
| 5,188,492 | A * | 2/1993 | McCracken | B27C 5/10 144/154.5 |
| 5,191,921 | A * | 3/1993 | McCurry | B23Q 16/001 144/136.95 |
| 5,692,574 | A * | 12/1997 | Terada | B25D 17/043 173/162.2 |
| 7,264,065 | B2 * | 9/2007 | Simm | B25D 16/006 173/109 |
| 7,413,532 | B1 | 8/2008 | Monsrud | A63B 21/0628 482/98 |
| 8,909,426 | B2 * | 12/2014 | Rhode | B62D 1/22 701/41 |
| 2002/0025888 | A1 * | 2/2002 | Germanton | A63B 21/063 482/1 |
| 2005/0176559 | A1 * | 8/2005 | Carter | A63B 21/063 482/94 |
| 2006/0217245 | A1 * | 9/2006 | Golesh | A63B 21/063 482/94 |
| 2007/0168061 | A1 * | 7/2007 | Iefuji | G05G 1/02 700/83 |
| 2007/0199806 | A1 * | 8/2007 | Da Dalt | H01H 19/6355 200/11 R |
| 2009/0075791 | A1 * | 3/2009 | Kissel | A63B 21/155 482/93 |
| 2009/0113091 | A1 * | 4/2009 | Miller | G06F 3/046 710/64 |
| 2009/0256725 | A1 | 10/2009 | Yang et al. | |
| 2009/0261990 | A1 | 10/2009 | Wu et al. | |
| 2010/0084151 | A1 * | 4/2010 | Kuhnle | B25D 16/006 173/47 |
| 2012/0045077 | A1 * | 2/2012 | Nakazawa | H04R 1/04 381/123 |
| 2014/0119949 | A1 * | 5/2014 | Wischstadt | B08B 3/026 417/34 |
| 2015/0007404 | A1 * | 1/2015 | Prosser | B25G 3/38 15/144.1 |
| 2015/0158168 | A1 * | 6/2015 | Lauterwald | B25D 16/006 173/48 |
| 2015/0205287 | A1 * | 7/2015 | Igarashi | B23Q 1/0045 318/591 |
| 2015/0212510 | A1 | 7/2015 | Hsu et al. | |
| 2016/0023344 | A1 * | 1/2016 | Bernhart | G05G 1/10 173/48 |
| 2016/0178084 | A1 * | 6/2016 | White | F04B 49/22 137/553 |
| 2016/0332287 | A1 * | 11/2016 | Chen | B25F 5/001 |
| 2017/0052617 | A1 * | 2/2017 | Okuzumi | B60R 16/02 |
| 2017/0260037 | A1 * | 9/2017 | Dalton | B67D 1/1252 |
| 2018/0143614 | A1 * | 5/2018 | Aizawa | G05B 19/409 |

FOREIGN PATENT DOCUMENTS

| | | |
|---|---|---|
| CN | 101439481 A | 5/2009 |
| CN | 102799149 A | 11/2012 |
| CN | 202549686 U | 11/2012 |
| CN | 104576095 A | 4/2015 |
| DE | 202010010838 U1 | 12/2010 |
| DE | 102010062919 A1 | 6/2011 |
| EP | 2979820 A1 | 2/2016 |
| JP | 11305815 A | 11/1999 |
| JP | 2007160449 A | 6/2007 |
| JP | 2010515592 A | 5/2010 |
| JP | 2010218096 A | 9/2010 |
| KR | 101315332 B1 | 10/2013 |

OTHER PUBLICATIONS

English Abstract and Machine Translation for Korean Patent No. 101315332 B1, dated Oct. 8, 2013, 16 pages.

English Abstract and Machine Translation for Japanese Publication No. 2010-515592 published on May 13, 2010, 11 pages.

English Abstract and Machine Translation for Japanese Publication No. 2007-160449 A, published on Jun. 28, 2007, 10 pages.

English Abstract and Machine Translation for Chinese Publication No. 104576095 A, published Apr. 29, 2015, 9 pgs.

English Abstract and Machine Translation for Chinese Publication No. 102799149 A, published Nov. 28, 2012, 12 pgs.

English Abstract and Machine Translation for Chinese Publication No. 202549686 U, published Nov. 21, 2012, 8 pgs.

English Abstract and Machine Translation for Chinese Publication No. 1192033 A, published Sep. 2, 1998, 11 pgs.

English Abstract and Machine Translation for Chinese Publication No. 101011803 A, published Aug. 8, 2007, 10 pgs.

English Abstract and Machine Translation for Chinese Publication No. 101439481 A, published May 27, 2009, 7 pgs.

English Abstract and Machine Translation for Japanese Publication No. 2010218096 A, published Sep. 30, 2010, 13 pgs.

English Machine Translation for German Publication No. 202010010838 U1, published Dec. 9, 2010, 9 pgs.

English Abstract and Machine Translation for German Publication No. 102010062919 A1, published Jun. 30, 2011, 30 pgs.

* cited by examiner

MANUAL PULSE GENERATING DEVICE

CROSS-REFERENCE TO RELATED APPLICATION

This application is based upon and claims the benefit of priority from Japanese Patent Application No. 2016-228285 filed on Nov. 24, 2016, the contents of which are incorporated herein by reference.

BACKGROUND OF THE INVENTION

Field of the Invention

The present invention relates to a manual pulse generating device for enabling manual operation of axial movement.

Description of the Related Art

In Japanese Laid-Open Patent Publication No. 11-305815, a handy pendant is disclosed which enables a movable body of a machine tool to be moved by way of manual operation. To provide a brief description thereof, the handy pendant includes a dial for generating drive pulses which are proportional to an amount of rotation, and an enable and deadman switch having a primary stop position, and a secondary stop position. The enable and deadman switch forms a manual operating state for the handy pendant when pushed to the primary stop position, and stops the movable body when pushed to the secondary stop position.

In this manner, conventionally, in such a handy pendant (hereinafter referred to as a manual pulse generating device), in order to prevent the dial from being operated contrary to the intentions of the operator, the enable switch is disposed in order to enable the generation of the drive pulses.

SUMMARY OF THE INVENTION

However, with such a conventional manual pulse generating device, while operating the manual pulse generating device with one hand, it is possible to perform operations of the enable switch and the dial. Consequently, the movable body undergoes movement in the event that the dial is mistakenly operated in a state in which the operator has also operated the enable switch.

Thus, an object of the present invention is to provide a manual pulse generating device which induces or encourages manual operation of axial movements using both hands.

An aspect of the present invention is characterized by a manual pulse generating device, including a rotatable dial, a pulse generating unit configured to generate drive pulses for commanding axial movement of a machine tool in accordance with an amount of rotation of the dial, a casing having the dial disposed on a surface of the casing, and configured to accommodate the pulse generating unit in the interior of the casing, wherein the pulse generating unit enables the axial movement in accordance with the drive pulses when the dial is pressed toward the casing.

According to the present invention, it becomes difficult for the operator to grasp the manual pulse generating device and at the same time carry out manual operation of axial movements with one hand. Accordingly, it is possible to induce or encourage the performance of manual operation of axial movements as well as grasping of the manual pulse generating device using both hands.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a manual pulse generating device according to the present invention will be presented and described in detail below with reference to the accompanying drawings.

First Embodiment

Figure 1:
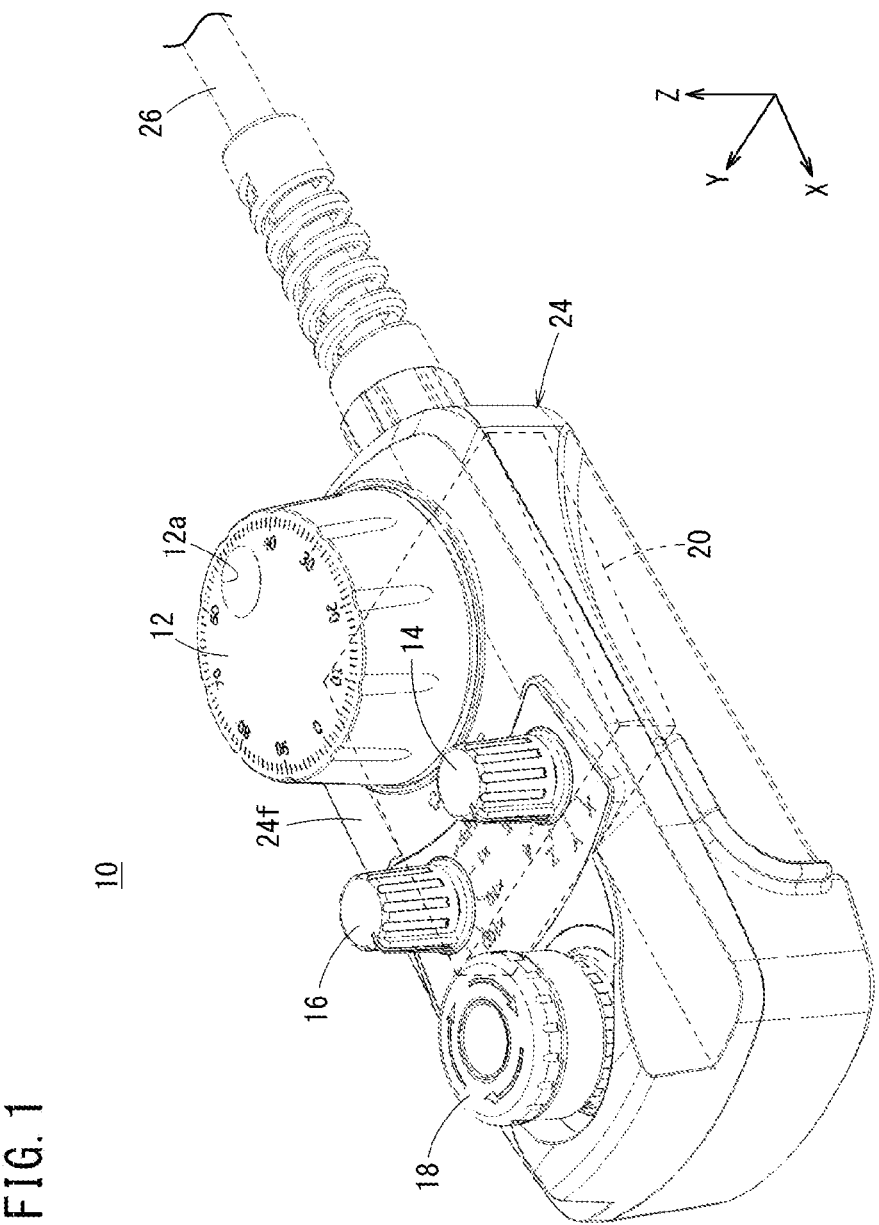
FIG. 1 is an external perspective view of a manual pulse generating device according to a first embodiment.

FIG. 1 is an external perspective view of a manual pulse generating device 10. The manual pulse generating device 10 is a device for manually operating axial movements of a machine tool. The X direction, the Y direction, and the Z direction in FIG. 1 are mutually orthogonal directions. The X direction is a lengthwise direction (longitudinal direction), the Y direction is a widthwise direction (lateral direction), and the Z direction is a thickness direction of the manual pulse generating device 10.

The manual pulse generating device 10 is equipped with a dial 12, an axis selection unit 14, a magnification selection unit 16, an emergency stop switch 18, and a pulse generating unit 20. The pulse generating unit 20 is accommodated inside a casing 24 of the manual pulse generating device 10. The dial 12, the axis selection unit 14, the magnification selection unit 16, and the emergency stop switch 18 are disposed on a front surface 24$f$ of the casing 24. The casing 24 is formed with a maximal length in the longitudinal direction, a second longest length in the widthwise direction, and a shortest length in the thickness direction. A cable 26 is connected to one end side (a side in the negative X direction) in the longitudinal direction of the casing 24. The cable 26 serves to output an output signal (drive pulses, etc.) from the manual pulse generating device 10 to a numerical controller (not shown) of the machine tool.

The dial 12 is disposed on the front surface 24f on one end side (a side in the negative X direction) in the longitudinal direction of the casing 24, and the emergency stop switch 18 is disposed on the front surface 24f on another end side (a side in the positive X direction) in the longitudinal direction of the casing 24. Further, the axis selection unit 14 and the magnification selection unit 16 are disposed on the front surface 24f in a central vicinity in the longitudinal direction of the casing 24. The axis selection unit 14 is disposed on the one end side (a side in the negative Y direction) in the lateral direction (width direction) of the casing 24, and the magnification selection unit 16 is disposed on the other end side (a side in the positive Y direction) in the lateral direction of the casing 24.

The dial 12 is an operation unit for the purpose of generating drive pulses to manually operate axial movements of the machine tool. The dial has a cylindrical or columnar shape. The dial 12 is rotatable about an axis in the Z direction. In the case that the operator wants the direction of axial movement to be in a positive direction, the operator rotates the dial 12 in the positive direction (clockwise), whereas in the case that the operator wants the direction of axial movement to be in a negative direction, the operator rotates the dial 12 in the negative direction (counterclockwise).

The axis selection unit 14 is operated to select an axis (X-axis, Y-axis, Z-axis, 4th-axis, 5th-axis) of the machine tool to undergo axial movement. The magnification selection unit 16 is operated to select a magnification. The axis selection unit 14 and the magnification selection unit 16 have a cylindrical or columnar shape and are rotatable about axes in the Z direction. The emergency stop switch 18 is a switch for urgently stopping axial movement, and is pressed down by the operator in an emergency situation.

The pulse generating unit 20 generates drive pulses (a drive pulse train) to command axial movement corresponding to an amount of rotation of the dial 12. The pulse generating unit 20 generates positive drive pulses if the dial 12 is rotated in a positive direction, and generates negative drive pulses if the dial 12 is rotated in a negative direction. As the amount at which the dial 12 is rotated by the operator is greater, the number of drive pulses that are generated becomes greater, and the distance of axial movement becomes longer. Further, as the speed of rotation of the dial 12 is made faster, the interval between the generated drive pulses becomes shorter, and therefore, the speed of the axial movement becomes faster. The generated drive pulses are transmitted to the numerical controller via the cable 26. The pulse generating unit 20 also transmits to the numerical controller a signal (hereinafter referred to as an axis signal) to indicate the axis that was selected by the axis selection unit 14, and a signal (hereinafter referred to as a magnification signal) to indicate the magnification that was selected by the magnification selection unit 16.

The numerical controller controls axial movement of the machine tool using the transmitted drive pulses, axis signal, and magnification signal. The numerical controller controls axial movement of the axis that was selected by the axis selection unit 14. When the magnification is times one (×1), the numerical controller moves the selected axis a predetermined distance L by a drive pulse of one pulse. Accordingly, in the case that the selected magnification is times N (×N), the numerical controller moves the selected axis by a distance of L×N by a drive pulse of one pulse. Consequently, the higher the magnification, the movement speed of the axial movement becomes faster, and the distance becomes longer. The pulse generating unit 20 may also generate drive pulses in accordance with the selected magnification and the amount of rotation of the dial 12. In this case, the generated drive pulses are drive pulses which are compensated on the basis of the selected magnification.

When the dial 12 is pressed toward the casing 24, the pulse generating unit 20 enables the axial movement in accordance with the drive pulses. Below, a description will be given in detail concerning configurations in which the axial movement in accordance with the drive pulses is enabled when the dial 12 is pressed toward the casing 24.

Figure 2:
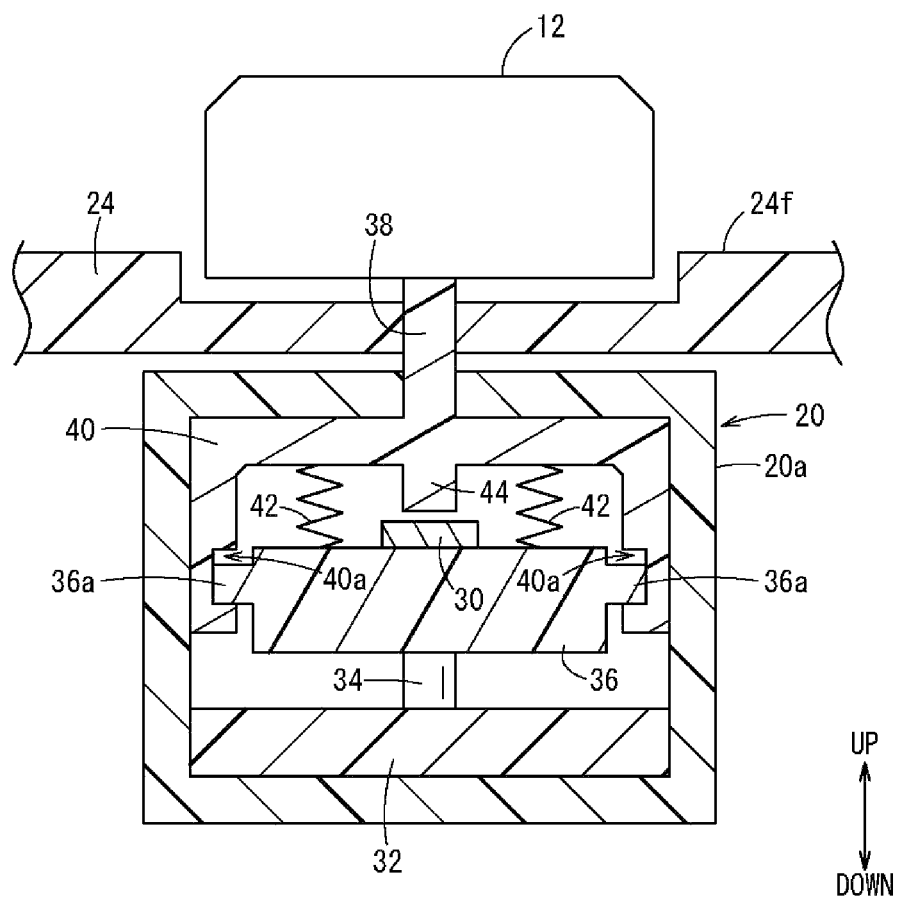
FIG. 2 is a view showing a configuration for enabling axial movement in accordance with drive pulses when a dial is pressed toward a casing in the first embodiment.

FIG. 2 is a view showing a configuration for enabling axial movement in accordance with the drive pulses when the dial 12 is pressed toward the casing 24. In FIG. 2, a press detection unit 30 which detects that the dial 12 has been pressed is provided in the pulse generating unit 20. When the press detection unit 30 detects pressing of the dial 12, the pulse generating unit 20 enables the axial movement in accordance with the drive pulses. During a period in which pressing of the dial 12 is being detected by the press detection unit 30, the pulse generating unit 20 transmits an enable signal to the numerical controller, whereby the axial movement in accordance with the drive pulses is enabled. The press detection unit 30 is constituted, for example, by a pressure sensor, a pressure sensitive sensor, a touch sensor, a switch, or the like. In the description given below, it is assumed that the direction (negative Z direction) in which the dial 12 is pressed is a downward direction, and the direction (positive Z direction) opposite to the direction in which the dial 12 is pressed is an upward direction.

The numerical controller permits axial movement in accordance with the drive pulses only during a period in which the enable signal is transmitted. Moreover, the axial movement in accordance with the drive pulses may be enabled by the pulse generating unit 20 generating the drive pulses and outputting them to the numerical controller only during a period in which the press detection unit 30 detects pressing of the dial 12. Further, the axial movement in accordance with the drive pulses may be enabled by the pulse generating unit 20 outputting the generated drive pulses to the numerical controller only during a period in which the press detection unit 30 detects pressing of the dial 12.

More specifically, a pulse generator 32 that generates drive pulses corresponding to an amount of rotation of the dial 12 (first rotary shaft 34), a first rotary shaft (rotary shaft) 34 connected to the pulse generator 32, and a substantially disk-shaped first rotating member 36 disposed on a distal end part (upper part) of the first rotary shaft 34 are disposed inside a housing 20a of the pulse generating unit 20. The first rotary shaft 34 rotates together with the first rotating member 36. A distal end side of a second rotary shaft (rotary shaft) 38 that is connected to the dial 12 is inserted into the interior of the housing 20a, and a second rotating member 40 is disposed on a distal end part (lower part) of the second rotary shaft 38. The second rotating member 40 has a cylindrical shape, and is formed so as to cover at least the upper surface and the outer circumferential surface of the first rotating member 36, and further, is movable with respect to the first rotating member 36 in the pressing direction (vertical direction) of the dial 12. The dial 12, the second rotary shaft 38, and the second rotating member 40 rotate together.

A plurality of protruding portions 36a, which project radially outward, are provided on the outer circumferential surface of the first rotating member 36. A plurality of concave portions 40a which are fitted with the plurality of protruding portions 36a are formed on the inner circumferential surface of the second rotating member 40, and are oriented toward directions in which the protruding portions 36a project. The protruding portions 36a and the concave portions 40a are fitted together in a manner so that the rotational force of the second rotating member 40 is transmitted to the first rotating member 36. Stated otherwise, a length of the protruding portion 36a in the circumferential direction is substantially the same as a length of the concave portion 40a in the circumferential direction.

Further, the protruding portions 36a and the concave portions 40a are fitted together in a manner so that the second rotating member 40 is capable of moving (sliding) in the pressing direction with respect to the first rotating member 36. Stated otherwise, the length of the concave portions 40a in the vertical direction is formed to be longer than a thickness of the protruding portions 36a in the vertical direction. In addition, the second rotating member 40 is biased so that the dial 12 is located and placed in an initial position in relation to the pressing direction of the dial 12. More specifically, a biasing member 42 such as a spring or the like is disposed between the first rotating member 36 and the second rotating member 40. By the biasing member 42, the second rotating member 40 is urged upwardly with respect to the first rotating member 36.

A press detection unit 30 is disposed on the upper surface of the first rotating member 36, and a pressing member 44 adapted to press the press detection unit 30 is provided on an inner surface of the second rotating member 40. When the dial 12 is pressed down by the operator from the initial position toward the casing 24, the second rotating member 40 moves downward in opposition to the biasing force of the biasing member 42. As a result, the press detection unit 30 is pressed by the pressing member 44. Consequently, the press detection unit 30 can detect pressing of the dial 12.

In this manner, when the dial 12 is pressed (when pressing thereof is detected by the press detection unit 30), the pulse generating unit 20 enables the axial movement in accordance with the drive pulses. Accordingly, in the case that manual operation of axial movement is performed, the operator must not only simply rotate the dial 12, but must also carry out such rotation in a state with the dial 12 pressed down.

Although it is possible to perform a rotation operation by touching the side surface of the dial 12 with one hand that has grasped the manual pulse generating device 10 (casing 24), it is difficult to touch the upper surface of the dial 12 and to carry out the pressing operation. Therefore, when manual operation of axial movement is performed, the operator is required to grasp the manual pulse generating device 10 (casing 24) with one hand, and also to carry out the rotation operation while pressing the dial 12 with the other hand. Accordingly, it is possible to induce or encourage the performance of manual operation of axial movement as well as grasping of the manual pulse generating device 10 using both hands.

On the upper surface of the dial 12, a circular operation recess 12a is formed in order to facilitate operation of the dial 12 by the tip of the finger (see FIG. 1). In the case that both pressing and rotation operations of the dial 12 are performed, there can be considered two operation methods, that is, a first operation method in which the tip of the finger is placed in contact with the operation recess 12a and the dial 12 is subjected to a rotation operation while being pressed down, and a second operation method in which the outer circumferential surface of the dial 12 is gripped, and the dial 12 is subjected to the rotation operation while being pressed down.

In the case of the first operation method, the rotational speed of the dial 12 can be increased, and the dial 12 can be rotated continuously a plurality of times, which is effective when it is desired to move the axis quickly. On the other hand, in the case of the second operation method, the rotational speed of the dial 12 becomes slower, and the amount by which the dial 12 is rotated becomes smaller in comparison with the first operation method, however, since fine rotational operations can be performed, such a method is effective in the case that fine adjustments to the position of the axis are desired.

Second Embodiment

Figure 3:
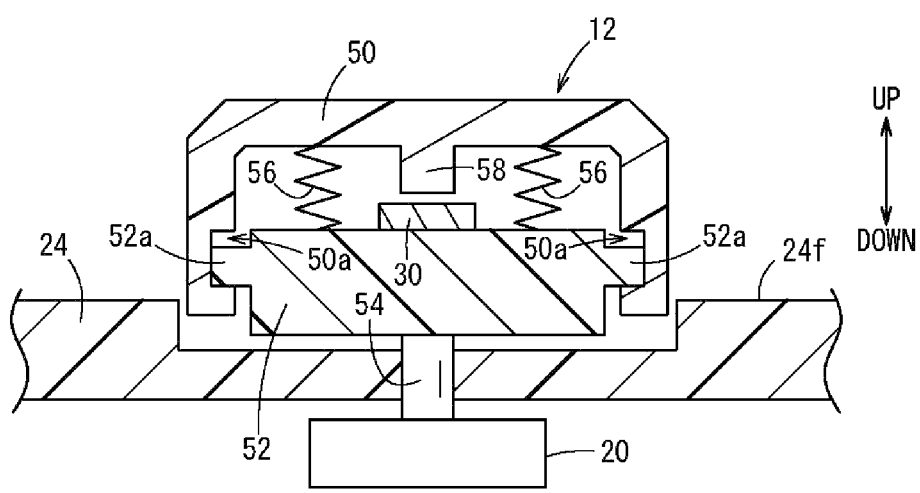
FIG. 3 is a view showing a configuration for enabling axial movement in accordance with drive pulses when a dial is pressed toward the casing in a second embodiment.

FIG. 3 is a view showing a configuration for enabling axial movement in accordance with drive pulses when the dial 12 is pressed toward the casing 24 in a second embodiment. Structural features thereof which are the same as those of the above-described first embodiment (the configuration shown in FIG. 2) are denoted with the same reference characters.

The second embodiment differs from the first embodiment in that a press detection unit 30 which detects that the dial 12 has been pressed is disposed inside the dial 12. The dial 12 includes a housing 50 with a cylindrical shape that forms the external appearance of the dial 12, and a rotating member 52 disposed inside the housing 50. The housing 50 of the dial 12 is formed so as to cover at least the upper surface and the outer circumferential surface of the rotating member 52, and is movable along a pressing direction (vertical direction) of the dial 12 with respect to the rotating member 52.

A rotary shaft 54 that is connected to the pulse generating unit 20 is also connected to the rotating member 52. The pulse generating unit 20 generates drive pulses in accordance with an amount of rotation of the rotary shaft 54. The rotary shaft 54 rotates together with the rotating member 52. Protruding portions 52a, which project radially outward, are provided on the outer circumferential surface of the rotating member 52. Concave portions 50a which are fitted with the protruding portions 52a are formed on the inner circumferential surface of the housing 50, and are oriented toward directions in which the protruding portions 52a project. The concave portions 50a and the protruding portions 52a are fitted together in a manner so that the rotational force of the housing 50 is transmitted to the rotating member 52. Stated otherwise, a length of the protruding portion 52a in the circumferential direction is substantially the same as a length (width) of the concave portion 50a in the circumferential direction.

Further, the concave portions 50a and the protruding portions 52a are fitted together in a manner so that the housing 50 is capable of moving (sliding) in the pressing direction (vertical direction) with respect to the rotating member 52. Stated otherwise, the length of the concave portion 50a in the vertical direction is formed to be longer than a thickness of the protruding portion 52a in the vertical direction. In addition, the housing 50 is biased so that the housing 50 is located and placed in an initial position in relation to the pressing direction of the dial 12. More specifically, a biasing member 56 such as a spring or the like is disposed between the housing 50 and the rotating member 52. By the biasing member 56, the housing 50 is urged upwardly with respect to the rotating member 52.

A press detection unit 30 is disposed on the upper surface of the rotating member 52, and a pressing member 58 adapted to press the press detection unit 30 is provided on an inner surface of the housing 50. When the dial 12 is pressed down by the operator from the initial position toward the casing 24, the housing 50 moves downward in opposition to the biasing force of the biasing member 56. As a result, the press detection unit 30 is pressed by the pressing member 58. Consequently, the press detection unit 30 can detect pressing of the dial 12.

In this manner, according to the second embodiment as well, in the case that manual operation of axial movement is performed, the operator is required to grasp the manual pulse generating device 10 (casing 24) with one hand, and also to carry out the rotation operation while pressing the dial 12 with the other hand. Accordingly, it is possible to induce or encourage the performance of manual operation of axial movement as well as grasping of the manual pulse generating device 10 using both hands.

Third Embodiment

The third embodiment differs from the first and second embodiments, in that the dial 12 can be pressed down from the initial position, and can also be pulled up from the initial position.

Figure 4A:
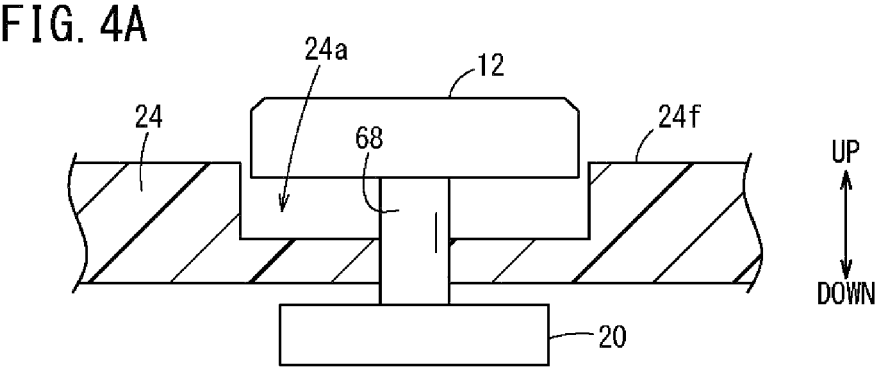
FIG. 4A is a schematic view showing a state in which a dial is in an initial position in a third embodiment.
Figure 4B:
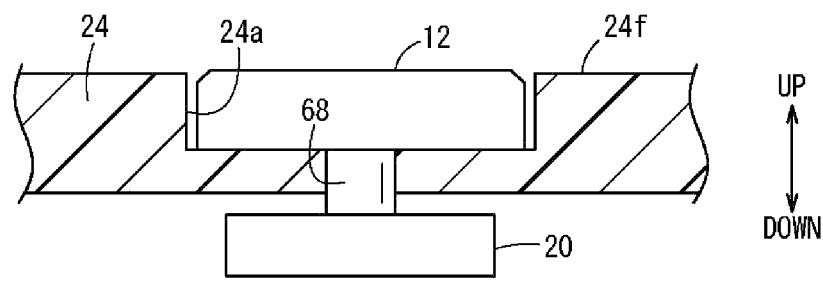
FIG. 4B is a schematic view showing a state in which the dial is pressed down from the initial position in the third embodiment.
Figure 4C:
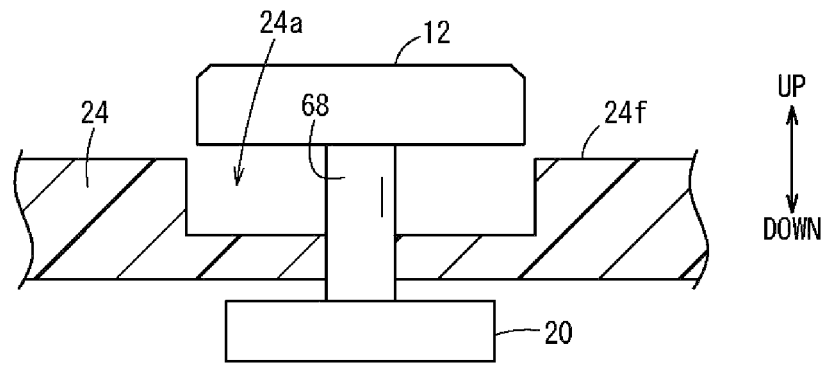
FIG. 4C is a schematic view showing a state in which the dial is pulled up from the initial position in the third embodiment.

FIG. 4A is a schematic view showing a state in which the dial 12 is in an initial position, FIG. 4B is a schematic view showing a state in which the dial 12 is pressed down from the initial position, and FIG. 4C is a schematic view showing a state in which the dial 12 is pulled up from the initial position. In the description of the third embodiment as well, structural features thereof which are the same as those of the above-described first embodiment (the configuration shown in FIG. 2) are denoted with the same reference characters.

An accommodating recess 24a in which the dial 12 is accommodated is formed on the surface (front surface 24f) of the casing 24. When the dial 12 is pressed down, the accommodating recess 24a accommodates the dial 12 in a manner so that a state is brought about in which the dial 12 becomes submerged within the casing 24 (see FIG. 4B). When the dial 12 is pressed down, a condition occurs in which the operator is incapable of rotating the dial 12 by holding the outer circumferential surface of the dial 12, and manual operation of axial movement can only be performed by carrying out an operation on the upper surface of the dial 12 with a finger. Stated otherwise, FIG. 4B is a view showing a state of the dial 12 at a time of the first operation method. On the other hand, FIG. 4C is a view showing a state of the dial 12 at a time of the second operation method in which the dial is operated by holding the outer circumferential surface of the dial 12.

Figure 5:
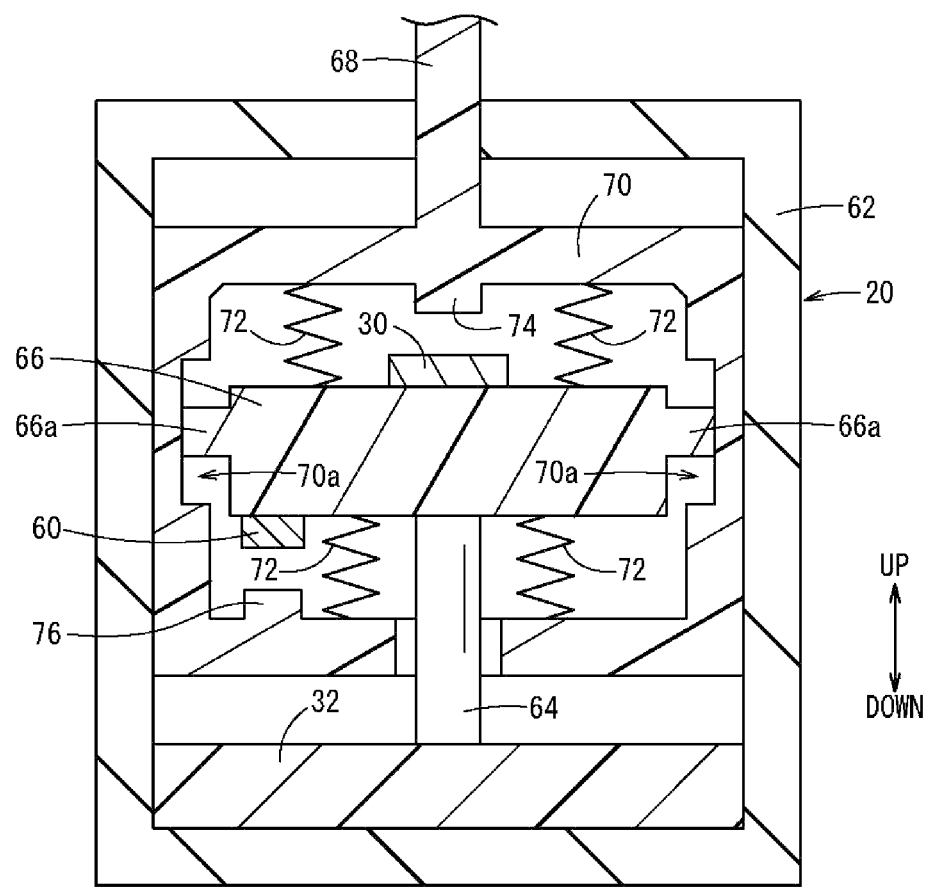
FIG. 5 is a view showing a configuration for enabling axial movement in accordance with drive pulses, when the dial is pressed toward the casing, or when the dial is pulled up toward an outer side of the casing in the third embodiment.

FIG. 5 is a view showing a configuration for enabling axial movement in accordance with drive pulses, when the dial 12 is pressed toward the casing 24, or when the dial 12 is pulled up toward an outer side of the casing 24 in a third embodiment. In the third embodiment, in addition to the press detection unit 30 which detects that the dial 12 has been pressed, a pull-up detection unit 60 is provided for detecting that the dial 12 has been pulled up. Although the press detection unit 30 and the pull-up detection unit 60 may be disposed inside the pulse generating unit 20, or may be disposed inside the dial 12, in the present embodiment, a description will be given as an example of a case in which the press detection unit 30 and the pull-up detection unit 60 are disposed in the interior of the pulse generating unit 20. Moreover, the pull-up detection unit 60 is constituted by a pressure sensor, a pressure sensitive sensor, a touch sensor, a switch, or the like, as with the press detection unit 30.

In the case that the press detection unit 30 detects pressing of the dial 12, or alternatively, in the case that the pull-up detection unit 60 detects pulling up of the dial 12, the pulse generating unit 20 enables the axial movement in accordance with the drive pulses. During a period in which pressing of the dial 12 is being detected by the press detection unit 30, or during a period in which pulling up of the dial 12 is being detected by the pull-up detection unit 60, the pulse generating unit 20 transmits an enable signal to the numerical controller, whereby the axial movement in accordance with the drive pulses is enabled.

Moreover, only during the period in which pressing of the dial 12 is being detected by the press detection unit 30, or only during the period in which pulling up of the dial 12 is being detected by the pull-up detection unit 60, the pulse generating unit 20 may enable the axial movement in accordance with the drive pulses by generating the drive pulses and outputting them to the numerical controller. Further, only during the period in which pressing of the dial 12 is being detected by the press detection unit 30, or only during the period in which pulling up of the dial 12 is being detected by the pull-up detection unit 60, the pulse generating unit 20 may enable the axial movement in accordance with the drive pulses by outputting the generated drive pulses to the numerical controller.

A pulse generator 32 that generates drive pulses corresponding to an amount of rotation of the dial 12 (first rotary shaft 64), a first rotary shaft (rotary shaft) 64 connected to the pulse generator 32, and a substantially disk-shaped first rotating member 66 disposed on a distal end part (upper part) of the first rotary shaft 64 are disposed inside a housing 62 of the pulse generating unit 20. The first rotary shaft 64 rotates together with the first rotating member 66. A distal end side of a second rotary shaft 68 that is connected to the dial 12 (refer to FIGS. 4A to 4C) is inserted into the interior of the housing 62, and a second rotating member 70 is disposed on a distal end part (lower part) of the second rotary shaft (rotary shaft) 68. The second rotating member 70 has a cylindrical shape, and is formed so as to cover (encase) the entirety of the first rotating member 66, and is movable with respect to the first rotating member 66 in the pressing and pulling directions (vertical directions) of the dial 12. The dial 12, the second rotary shaft 68, and the second rotating member 70 rotate together.

A plurality of protruding portions 66a, which project radially outward, are provided on the outer circumferential surface of the first rotating member 66. A plurality of concave portions 70a which are fitted with the plurality of protruding portions 66a are formed on the inner circumferential surface of the second rotating member 70, and are oriented toward directions in which the protruding portions 66a project. The protruding portions 66a and the concave portions 70a are fitted together in a manner so that the rotational force of the second rotating member 70 is transmitted to the first rotating member 66. Stated otherwise, a length of the protruding portion 66a in the circumferential direction is substantially the same as a length of the concave portion 70a in the circumferential direction.

Further, the protruding portions 66a and the concave portions 70a are fitted together in a manner so that the second rotating member 70 is capable of moving (sliding) in the pressing direction with respect to the first rotating member 66. Stated otherwise, the length of the concave portions 70a in the vertical direction is formed to be longer than a thickness of the protruding portions 66a in the vertical direction. In addition, the second rotating member 70 is biased so that the dial 12 is located and placed in an initial position in relation to the pressing direction and the pulling direction of the dial 12. More specifically, between the first rotating member 66 and an upper wall of the second rotating member 70, as well as between the first rotating member 66 and a lower wall (bottom wall) of the second rotating member 70, biasing members 72 in the form of springs or the like are provided.

The press detection unit 30 is disposed on the upper surface of the first rotating member 66, and a pull-up detection unit 60 is disposed on the lower surface of the first rotating member 66. A pressing member 74 adapted to press the press detection unit 30 is disposed on the lower surface of the upper wall of the second rotating member 70, and a pressing member 76 adapted to press the pull-up detection unit 60 is disposed on the upper surface of the lower wall of the second rotating member 70.

When the dial 12 is pressed down by the operator from the initial position toward the casing 24, the second rotating member 70 moves downward in opposition to the biasing force of the biasing member 72. As a result, the press detection unit 30 is pressed by the pressing member 74. Consequently, the press detection unit 30 can detect pressing of the dial 12. Conversely, when the dial 12 which is in the initial position is pulled up from the casing 24 by the operator, the second rotating member 70 moves in an upward direction in opposition to the biasing force of the biasing member 72. As a result, the pull-up detection unit 60 is pressed by the pressing member 76. Consequently, the pull-up detection unit 60 can detect pulling up of the dial 12.

In this manner, according to the third embodiment as well, in the case that manual operation of axial movement is performed, the operator is required to grasp the manual pulse generating device 10 (casing 24) with one hand, and also to carry out the rotation operation while pressing the dial 12 with the other hand. Accordingly, it is possible to induce or encourage the performance of manual operation of axial movement as well as grasping of the manual pulse generating device 10 using both hands.

Moreover, according to the third embodiment, although a configuration was provided in which the dial 12 can be both pressed down and pulled up, only one of pressing-down and pulling-up may be performed.

Fourth Embodiment

Figure 6:
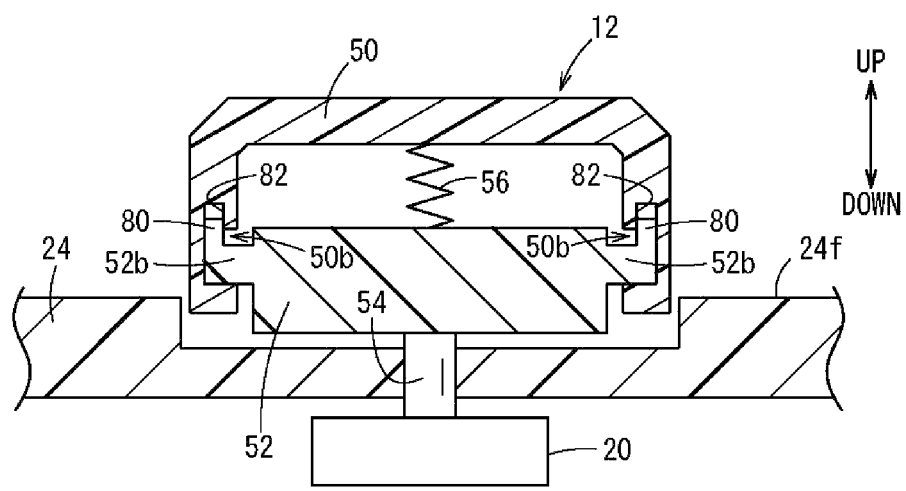
FIG. 6 is a view showing a configuration for enabling axial movement in accordance with drive pulses when a dial is pressed toward the casing in a fourth embodiment.

FIG. 6 is a view showing a configuration for enabling axial movement in accordance with drive pulses when the dial 12 is pressed toward the casing 24 in a fourth embodiment. Structural features thereof which are the same as those of the above-described second embodiment (the configuration shown in FIG. 3) are denoted with the same reference characters. The fourth embodiment differs from the first through third embodiments in that, without using the press detection unit 30, switching is performed between enabling and disenabling of the axial movement in accordance with the drive pulses.

A protruding portion 52b, which projects radially outward, is provided on the outer circumferential surface of the rotating member 52, spanning over the entirety thereof in the circumferential direction. A concave portion 50b is formed on the inner circumferential surface of the housing 50, spanning over the entirety thereof in the circumferential direction so as to receive the protruding portion 52b. The concave portion 50b and the protruding portion 52b are formed in a manner so that the housing 50 is capable of moving (sliding) in the pressing direction (vertical direction) with respect to the rotating member 52. Stated otherwise, the length of the concave portion 50b in the vertical direction is formed to be longer than a thickness of the protruding portion 52b in the vertical direction. The housing 50 is biased by a biasing member 56 so that the housing 50 is located and placed in an initial position in relation to the pressing direction of the dial 12.

A fitting protrusion 80, which protrudes upwardly over the entire circumferential direction, is formed on a distal end (outer end part) of the protruding portion 52b, and a fitting recess 82, which is recessed upwardly over the entire circumferential direction, is formed in the concave portion 50b so as to be fitted together with the fitting protrusion 80. When the dial 12 (housing 50) is located in the initial position, the fitting protrusion 80 and the fitting recess 82 are in a non-engaged state, whereas when the dial 12 (housing 50) is pressed down from the initial position, the fitting protrusion 80 and the fitting recess 82 are placed in an engaged state. Accordingly, when the operator presses the housing 50 downward from the initial position toward the casing 24 and performs the rotation operation, the housing 50 and the rotating member 52 become fitted together due to the downward pressing action, and the housing 50 and the rotating member 52 are rotated together.

Since the rotary shaft 54 is rotated due to the rotation of the rotating member 52, axial movement in accordance with the drive pulses is enabled by the pulse generating unit 20 generating the drive pulses corresponding to an amount of rotation of the rotary shaft 54, and outputting the drive pulses to the numerical controller.

In this manner, according to the fourth embodiment as well, in the case that manual operation of axial movement is performed, the operator is required to grasp the manual pulse generating device 10 (casing 24) with one hand, and also to carry out the rotation operation while pressing the dial 12 with the other hand. Accordingly, it is possible to induce or encourage the performance of manual operation of axial movement as well as grasping of the manual pulse generating device 10 using both hands. Further, there is no need to provide the press detection unit 30.

Fifth Embodiment

Figure 7:
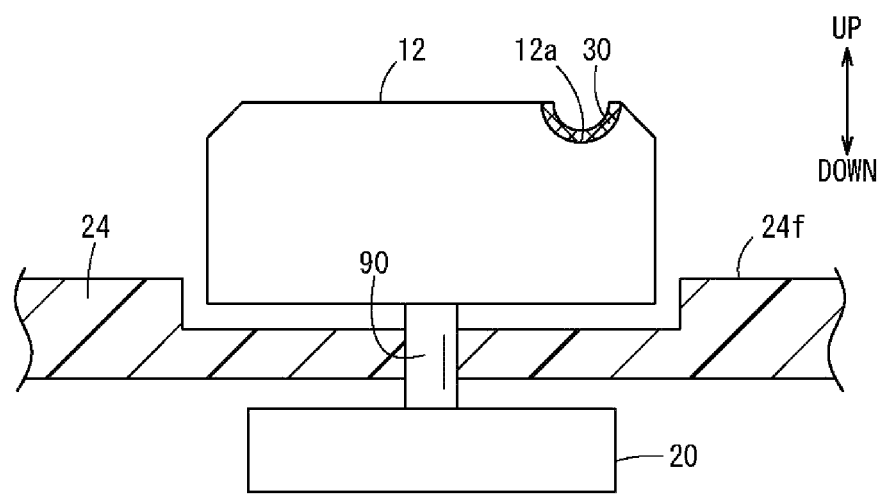
FIG. 7 is a view showing a configuration for enabling axial movement in accordance with drive pulses when a dial is pressed toward the casing in a fifth embodiment.

FIG. 7 is a view showing a configuration for enabling axial movement in accordance with drive pulses when the dial 12 is pressed toward the casing 24 in a fifth embodiment. Structural features thereof which are the same as those of the above-described first embodiment (the configuration shown in FIG. 2) are denoted with the same reference characters.

A rotary shaft 90, which is rotated together with rotation of the dial 12, is connected to the pulse generating unit 20. The press detection unit 30 is disposed in an operation recess 12a that is formed on the upper surface of the dial 12. When pressing of the dial 12 is detected by the press detection unit 30 that is provided in the operation recess 12a, the pulse generating unit 20 enables the axial movement in accordance with the drive pulses. Accordingly, the operator can carry out manual operation of axial movements by performing a rotation operation while pressing the operation recess 12a with the finger. In this manner, according to the fifth embodiment as well, it is possible to induce or encourage the performance of manual operation of axial movement as well as grasping of the manual pulse generating device 10 using both hands.

Sixth Embodiment

Figure 8:
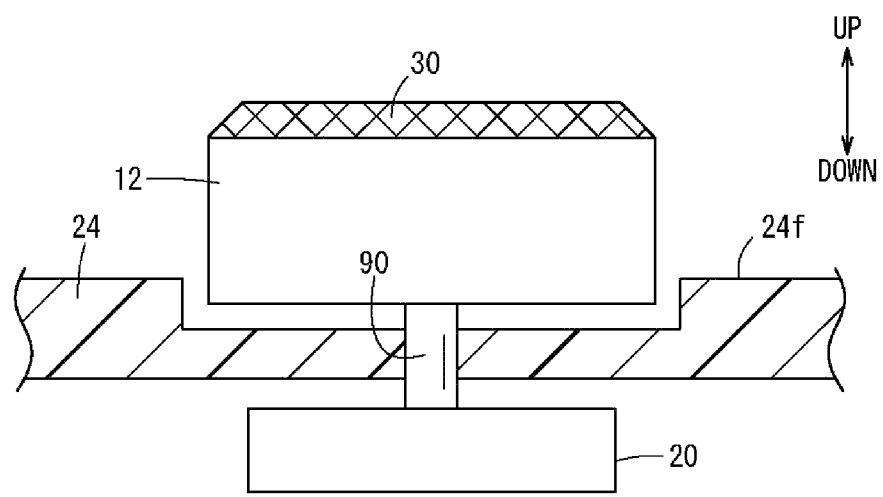
FIG. 8 is a view showing a configuration for enabling axial movement in accordance with drive pulses when a dial is pressed toward the casing in a sixth embodiment.

FIG. 8 is a view showing a configuration for enabling axial movement in accordance with drive pulses when the dial 12 is pressed toward the casing 24 in a sixth embodiment. Structural features thereof which are the same as those of the above-described fifth embodiment (the configuration shown in FIG. 7) are denoted with the same reference characters.

In the sixth embodiment, the press detection unit 30 is provided over the entire upper surface of the dial 12. Accordingly, the operator can carry out manual operation of axial movements by performing a rotation operation while pressing on the upper surface of the dial 12 with a finger or the palm of the hand. In this manner, according to the sixth embodiment as well, it is possible to induce or encourage the performance of manual operation of axial movement as well as grasping of the manual pulse generating device 10 using both hands.

[Modifications]

The respective embodiments described above may be modified in the following manner.

(Modification 1) According to the above-described fourth embodiment (see FIG. 6), when the housing 50 is pressed down from the initial position, the housing 50 and the rotating member 52 are fitted in engagement so that the housing 50 and the rotating member 52 are capable of rotating together. However, also when the housing 50 is pulled up from the initial position, the housing 50 and the rotating member 52 may be fitted in engagement so that the housing 50 and the rotating member 52 are capable of rotating together. In this case as well, axial movement in accordance with the drive pulses is enabled by the pulse generating unit 20 generating the drive pulses corresponding to an amount of rotation of the rotary shaft 54 (rotating member 52), and outputting the drive pulses to the numerical controller.

(Modification 2) In the fifth embodiment (see FIG. 7) and the sixth embodiment (see FIG. 8) as well, a configuration, as described above in relation to the third embodiment, may be provided in which the dial 12 can be pulled up from the initial position, and the pull-up detection unit 60 may be disposed therein for detecting that the dial 12 has been pulled up from the initial position. In this case, also in the event that pulling up of the dial 12 is detected by the pull-up detection unit 60, the pulse generating unit 20 enables the axial movement in accordance with the drive pulses.

(Modification 3) A conventional enable switch may be separately provided on the manual pulse generating device 10 that was described above in each of the respective embodiments, as well as modifications 1 and 2. In this case, for example, in a state in which the enable switch is pressed, and further, when the dial 12 is pressed toward the casing 24, the pulse generating unit 20 may enable the axial movement in accordance with the drive pulses.

In the forgoing manner, the manual pulse generating device 10, as was described above in each of the respective embodiments and the respective modifications, is equipped with the rotatable dial 12, the pulse generating unit 20 adapted to generate drive pulses for commanding axial movement of the machine tool in accordance with an amount of rotation of the dial 12, and the casing 24 having the dial 12 disposed on a surface thereof as well as accommodating the pulse generating unit 20 in the interior thereof. When the dial 12 is pressed toward the casing 24, the pulse generating unit 20 enables the axial movement in accordance with the drive pulses. In accordance with these features, it becomes difficult for the operator to grasp the manual pulse generating device 10 (casing 24) and at the same time carry out manual operation of axial movements with one hand. Accordingly, it is possible to induce or encourage the performance of manual operation of axial movement as well as grasping of the manual pulse generating device 10 using both hands.

The manual pulse generating device 10 may further comprise the press detection unit 30 adapted to detect whether or not the dial 12 has been pressed toward the casing 24. When pressing of the dial 12 is detected, the pulse generating unit 20 may enable the axial movement in accordance with the drive pulses. Owing thereto, it is possible to easily detect whether or not the dial 12 has been pressed. The press detection unit 30 may be disposed inside the pulse generating unit 20, or may be disposed inside the housing 50 of the dial 12. Further, the press detection unit 30 may be disposed on the upper surface of the dial 12.

The dial 12 may be disposed so as to be capable of moving along the pressing direction of the dial 12, and may be biased so as to be located in an initial position in relation to the pressing direction of the dial 12. The press detection unit 30 detects pressing of the dial 12 when the dial 12 is pressed down from the initial position. In accordance with this feature, it is possible for the operator to perceive intuitively whether or not the dial 12 is being pressed.

An accommodating recess 24a adapted to accommodate the dial 12 therein may be formed on the surface of the casing 24, and the dial 12 may be accommodated in the accommodating recess 24a when the dial 12 is pressed down.

The dial 12 may be disposed so as to be capable of being pulled up from the initial position along the pressing direction of the dial 12. The manual pulse generating device 10 may further comprise a pull-up detection unit 60 adapted to detect whether or not the dial 12 has been pulled up from the initial position. In this case, when pulling up of the dial 12 is detected as well, the pulse generating unit 20 enables the axial movement in accordance with the drive pulses. In accordance therewith, manual operation of the axial movement can be performed by an operation method for the dial 12 that is suited to such axial movement.

The dial 12 and the rotary shaft 54 that is connected to the pulse generating unit 20 may be fitted together and become capable of rotating when the dial 12 is pressed down from the initial position. In this case, when the dial 12 is pressed down from the initial position, the pulse generating unit 20 may generate the drive pulses in accordance with the amount of rotation of the dial 12, and may thereby enable the axial movement in accordance with the drive pulses. In accordance with this feature, there is no need to provide the press detection unit 30.

The dial 12 and the rotary shaft 54 that is connected to the pulse generating unit 20 may be fitted together and become capable of rotating when the dial 12 is pulled up from the initial position. Also when the dial 12 is pulled up from the initial position, the pulse generating unit 20 may generate the drive pulses in accordance with the amount of rotation of the dial 12, and may thereby enable the axial movement in accordance with the drive pulses. In accordance with this feature, there is no need to provide the pull-up detection unit 60. Further, manual operation of the axial movement can be performed by an operation method for the dial 12 that is suited to such axial movement.

While the invention has been particularly shown and described with reference to preferred embodiments, it will be understood that variations and modifications can be effected thereto by those skilled in the art without departing from the scope of the invention as defined by the appended claims.

What is claimed is:

1. A manual pulse generating device, comprising:
a rotatable dial movable along a pressing direction in a first direction, wherein the rotatable dial is biased so as to be located in an initial position located in a second direction opposite the first direction;
a pulse generating unit configured to generate drive pulses for commanding axial movement of a machine tool in accordance with an amount of rotation of the dial; and
a casing having the dial disposed on a surface of the casing, and configured to accommodate the pulse generating unit in an interior of the casing, the casing has an accommodating recess formed on the surface of the casing configured to accommodate the dial therein when the dial is moved in the first direction; and
wherein, when the dial is pressed in the first direction toward the casing, the dial is accommodated in the accommodating recess and the pulse generating unit enables the axial movement in accordance with the drive pulses, wherein:
the dial is disposed so as to be movable along a pressing direction of the dial, and is biased so as to be located in an initial position in relation to a pressing direction of the dial;
the dial and a rotary shaft connected to the pulse generating unit are fitted together and become capable of rotating when the dial is pressed down from the initial position; and
when the dial is pressed down from the initial position, the pulse generating unit generates the drive pulses in accordance with the amount of rotation of the dial, and thereby enables the axial movement in accordance with the drive pulses.

2. The manual pulse generating device according to claim 1, further comprising a press detection unit configured to detect whether or not the dial has been pressed toward the casing;
wherein, when pressing of the dial is detected, the pulse generating unit enables the axial movement in accordance with the drive pulses.

3. The manual pulse generating device according to claim 2, wherein the press detection unit is disposed inside the pulse generating unit.

4. The manual pulse generating device according to claim 2, wherein the press detection unit is disposed inside a housing of the dial.

5. The manual pulse generating device according to claim 2, wherein:
the press detection unit detects pressing of the dial when the dial is pressed down from the initial position.

6. The manual pulse generating device according to claim 5, wherein:
the dial is disposed so as to be able to be pulled up from the initial position along the pressing direction of the dial;
the manual pulse generating device further comprises a pull-up detection unit configured to detect whether or not the dial has been pulled up from the initial position; and
when pulling up of the dial is detected, the pulse generating unit enables the axial movement in accordance with the drive pulses.

7. The manual pulse generating device according to claim 2, wherein the press detection unit is disposed on an upper surface of the dial.

8. The manual pulse generating device according to claim 7, wherein:
the dial is disposed so as to be able to be pulled up in a direction opposite to a pressing direction of the dial, and is biased so as to be located in an initial position with respect to the direction in which the dial is pulled up;
the manual pulse generating device further comprises a pull-up detection unit configured to detect whether or not the dial has been pulled up from the initial position; and
when pulling up of the dial is detected, the pulse generating unit enables the axial movement in accordance with the drive pulses.

9. The manual pulse generating device according to claim 1, wherein:
the dial is disposed so as to be able to be pulled up from the initial position along the pressing direction of the dial;
the dial and the rotary shaft are fitted together and become capable of rotating when the dial is pulled up from the initial position; and
when the dial is pulled up from the initial position, the pulse generating unit generates the drive pulses in accordance with the amount of rotation of the dial, and thereby enables the axial movement in accordance with the drive pulses.

* * * * *